Sept. 1, 1964

J. N. STEBBING, JR 3,146,747

PELLET FEED SOLDERING IRON

Filed June 22, 1960

INVENTOR.
John N. Stebbing, Jr.

BY Henry Shur

ATTORNEY

Sept. 1, 1964    J. N. STEBBING, JR    3,146,747
PELLET FEED SOLDERING IRON

Filed June 22, 1960    2 Sheets-Sheet 2

INVENTOR.
John N. Stebbing, Jr.
BY Henry Shur
ATTORNEY

United States Patent Office 3,146,747
Patented Sept. 1, 1964

1

3,146,747
PELLET FEED SOLDERING IRON
John N. Stebbing, Jr., Washington, D.C., assignor to George J. Schuller, Washington, D.C.
Filed June 22, 1960, Ser. No. 37,995
24 Claims. (Cl. 113—109)

This invention relates to improvements in soldering irons, and more especially to a new improved soldering iron which incorporates a storage compartment for a plurality of soldering pellets and means for positively feeding the pellets to the heating point of the soldering iron as desired.

The general practice in soldering is for the workman to hold the soldering iron in one hand and a wire of solder in the other hand and to cause the end of the solder to melt by application of the hot iron tip, with both the iron tip and solder positioned adjacent the parts to be soldered. This process not only requires use of two hands and a suitable work holder, but it is also frequently a difficult operation, especially in cramped quarters typical of complex electrical and electronic devices; it is also a quite slow operation. Further, soldering is accomplished with B.t.u.'s emanating from the iron tip, and it is difficult to control the quantity of heat applied to the solder; hence, the solder frequently will chill too quickly before making a good joint, or run excessively, depending on the amount of heat applied. Furthermore, there is generally a great waste of material with this soldering process, and in large volume operation, the cost of wasted solder can run into startlingly large sums, even when there is waste of only one drop of solder per soldered connection.

Because of these and other shortcomings of this generally accepted soldering process, there have been various attempts to develop self-feeding soldering irons, with which the operator can solder with one hand and with some control of the amount of solder applied. One alternate approach is a soldering iron which has a means for mounting a roll of solder wire and step-feeding the end to the heating point of the iron for the soldering operation. These wire feed devices are usually relatively complicated, and thus relatively costly, if they are to provide effective control of the amount of solder applied to the joints, and are relatively heavy so they induce operator fatigue, and have other shortcomings. As a result, the above-discussed long-time practice of two hand soldering with iron and wire is still in general usage in preference to such wire feed soldering irons.

There also have been various prior attempts over the years to provide an effective soldering iron having a compartment for storing solder pellets with some means adjacent the handle for feeding the pellets to the heating tip of the soldering iron, for one-hand soldering. However, the known pellet feeding soldering irons have a number of serious disadvantages. Most of them have a quite complex feeder mechanism which makes manufacturing costs prohibitive for an item of this kind. Further, these prior known pellet feed soldering devices are built with a special construction soldering iron. Because of this, they cannot be utilized with existing commercially available low-cost soldering irons, many of which have other desirable advantages such as special alloy tips, special thermostatic controlled heating elements, etc. Furthermore, notwithstanding the relatively complex construction of known prior pellet feeding mechanisms for such soldering irons, they do not actually provide controlled positive feed of the solder pellets to the iron tip; in fact, many of them actually rely on gravity feed between the storage chamber and the solder iron tip so that the pellet feed is not reliable. As a result, such irons cannot be used excepting in a downward pose, and they are difficult to use in awkward situations, or close quarters, where such a downward pose of the iron is not feasible. Furthermore, known prior pellet feed devices for soldering irons are so constructed that the iron will heat the solder pellets, expanding and/or melting them before they reach the iron tip; this will result in a solid solder mass that interferes with subsequent usage of the iron and may render it altogether useless.

It is a principal object of the present invention to provide a new improved pellet feed type soldering iron incorporating a storage chamber for a plurality of soldering pellets with a means adjacent the iron handle for positive controlled feeding of one solder pellet at a time to the heated soldering iron tip. It is a related object of the present invention to provide such a new improved pellet feed soldering iron which is positive acting so that the iron need not be held point down in use, and can in fact be used in almost any position, including near vertical.

It is another related object of the present invention to provide such a new improved pellet feed device for a soldering iron which includes means for preventing the solder from melting before being fed to the soldering iron heating tip at the point of application, whereby the parts to be soldered can be pre-heated without expansion and/or melting of the pellets in the feeder system, thus avoiding resultant malfunction or ruining of the feeding system.

It is yet another related object of this invention to provide such a new improved pellet feed soldering iron incorporating a novel arrangement of pellet compartment, associated finger operated feed means, transfer tubing, and end gate means which provide direct positive controllable manual feed of one pellet to the iron head for each finger operation.

It is still another related object of the present invention to provide such a new improved pellet feeding device for a soldering iron which is of such construction that it will not be jammed or broken, while enabling positive control of the amount of solder reaching the point of application at all times, thereby insuring good soldered joints.

It is another object of the present invention to provide a new improved pellet storage compartment and feeding device in the form of a sub-combination usable with conventional commercially available soldering irons of different types, and quickly applicable to such conventional irons, especially by convenient clamp means, thereby making it possible to obtain the advantages of my new improved pellet feed soldering iron combination with most of the commercially available soldering irons. It is a related object of the present invention to provide such a new improved solder pellet storage and feeder sub-combination which can be sold as a unit for conventional soldering irons, and which can be cheaply replaced in the event of damage without disposing of the entire soldering iron (whether purchased as a complete iron combination or as a feeder sub-combination).

It is still another object of the present invention to provide such a new improved pellet feed type soldering iron (and pellet feeder sub-combination for conventional irons) incorporating means for applying flux to the solder pellets just prior to their being fed to the iron heating tip.

It is still another object of the present invention to provide such a new improved pellet feed soldering iron of simple and practical construction which is efficient and reliable in operation, yet relatively inexpensive to manufacture so that it is competitive in the market for which it is intended.

Other objects and advantages of the present invention and how they are obtained will be apparent from the following description thereon with reference to the accompanying drawings, wherein like numerals refer to like parts throughout, and in which.

Figure 8:
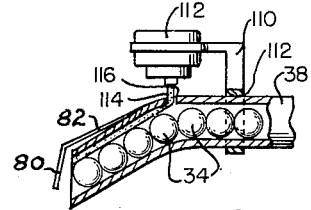
Figure 9:
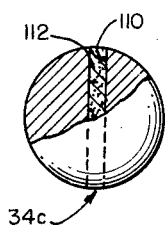

FIGURE 8 is a fragmentary horizontal sectional view of a modified form of solder pellet feeding device which incorporates means for applying a suitable flux to the solder pellets just prior to discharge from the feeder to the heated iron tip at the point of application; and FIGURE 9 is an enlarged, partly cross sectional view illustrating a suitable soldering pellet incorporating a predetermined amount of a suitable flux.

Referring especially to FIGURES 1-4 of the drawings, the hand-type pellet feeder soldering iron of the present invention therein shown comprises a conventional hand iron generally indicated by the numeral 20, with one embodiment of the new positive acting pellet feeder device of the present invention generally indicated by the numeral 22, mounted on the iron 20 by suitable clamp means 23 and 25.

The conventional hand soldering iron 20 comprises a handle 24 of wood or like non-conductive material, from which there extends at the forward end a tubular metal shank 26 within which there is a usual heating element. The forward end of soldering iron shank 26 is provided with a removable soldering tip 30 of conventional type. An electric cord 28 extends from the other end of the handle 24 and is connected to the heating element within the tubular shank 26. Since the soldering iron 20 may be of any conventional type currently available on the market, and does not per se constitute a part of the present invention, extended discussion thereof is unnecessary.

The new improved positive pellet feeder device generally indicated at 22 comprises a cylindrical storage compartment or hopper 32 having an enlarged top section 33 for accommodating a substantial number of solder pellets 34, with a bottom funnel section 35 sloping at a suitable angle (e.g., 15° from the horizontal) to a vertical cylindrical dispensing opening 36, through which the lowermost solder pellets 34 pass into an elongated feeder tube 38 to be fed to the iron tip 30 as hereinafter amplified.

The diameter of dispensing opening 36 is made sufficiently larger than the diameter of solder pellets 34 so that a plurality of pellets cannot form a block across the upper end of opening 36. On the other hand, the diameter of dispensing opening 36 is such that it can accommodate only one line of pellets, vertically disposed. The pellet chamber 32 is enclosed by a suitable top 29 which is retained by any suitable means, such as snap-acting detents 40 (or screw threads or like suitable means).

The lower end of the pellet hopper body 32 is provided with three axially aligned bores 42, 44 and 46, which are perpendicular to the axis of hopper dispensing opening 36. Bore 42, which intersects dispensing opening 36, has a slightly larger diameter than opening 44, to accommodate the rearward end of elongated feeder tube 38 which hereinafter is more fully discussed.

The end of enlarged bore 46 is threaded at 48, and receives an annular threaded plug 50, which has a central circular bore 52 that is axially aligned with, and has a slightly larger diameter than bore 44.

Figure 3:
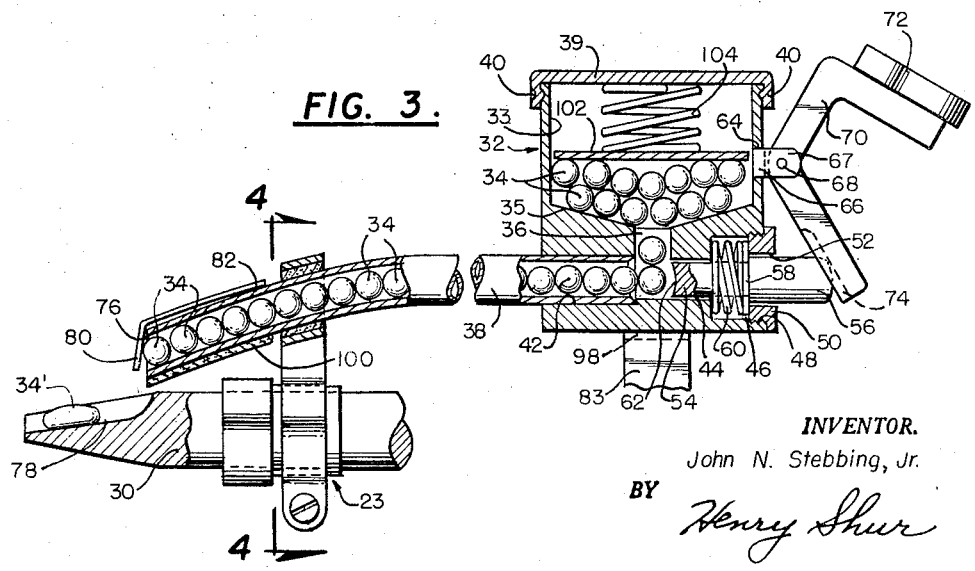
FIGURE 3 is an enlarged side elevation view of the new improved controlled positive pellet feeder sub-combination of the present invention which is utilized with the hand-type soldering iron shown in FIGURES 1 and 2, many of the parts being broken away and shown in cross-section for purposes of clearer illustration of the device.

A cylindrical plunger, which includes a forward section 54 of smaller diameter and a slightly larger diameter rearward section 56, is slidably mounted in aligned bores 44 and 52, as shown in FIGURE 3. A washer 58 is press-fitted on smaller plunger section 54, abutting the shoulder formed by the forward end of larger plunger section 56. A compression spring 60 within bore 46 acts against washer 58 and normally biases the plunger 54–56 rearward so that its leading end 62 is just rearward of hopper dispensing opening 36.

A small bore 64 is provided in the rear wall of pellet hopper 32, and one end 66 of a cylindrical plug is secured therein by a press fit, screw connection, or in any other suitable manner. The other end 67 of this plug is bifurcated and the two sides thereof are provided with aligned transverse bores that receive a pin 68. A bell crank operating lever 70, shaped as in FIGURE 3, is pivotally mounted on pin 68 between the two sides of bifurcated plug end 67, and is provided with a finger piece 72 for convenient operation. The lower leg of bell crank 70 is preferably provided with a longitudinal groove 74 which receives the upper part of plunger end 56, to prevent lateral displacement of the operating lever 70 with respect to the pellet feeding plunger 54–56 during operation.

The rear end of feeder tube 38 is secured in bore 42 of hopper body 32 by any suitable means, such as a press fit or threaded connection, and the inside diameter of tube 38 is the same as the diameter of bore 44 so that it effectively forms an extension thereof. The feeder tube 38 extends longitudinally from adjacent the handle portion of solder iron 20 and is bent downwardly at its forward end towards the tip 30 of the soldering iron, so that its open end 76 is just above a longitudinally extending groove 78 provided in the upper side of the soldering iron tip 30 (which is otherwise a conventional and removable tip).

A flat spring gate 80, which is shaped as shown in FIGURE 3, is mounted at one end 82 on the top of the feeder tube 38 by any suitable means, such as a spot weld which secures the rearward portion to the feeder tube; and the forward end of spring gate 80 extends partly over the front open end 76 of feeder tube 38 so that it will normally definitely retain the leading pellet 34 in the tube 38. Parts 54, 58, 60, 46 and 50 of the hand actuated plunger sub-assembly are dimensioned longitudinally in relation to the size of solder pellets 34 and the diameter of the funnel dispensing opening 36 so that, when the pellet feeder tube 38 is full and the finger piece 72 is depressed, (a) the leading end 62 of plunger 54–56 will push the rearward-most pellet 34 from below dispensing opening 36 into the feeder tube 38 and (b) thus positively displace the line of pellets 34 a distance which is in excess of the radius of pellets 34 but less than their diameter. As a result, the downward manipulation of finger piece 72 causes the foremost pellet 34 to be pushed out of the open end 76 of the feeder tube 38, past the spring gate 80 and onto the grooved portion 78 of the solder iron tip 30. The solder pellet will melt, as indicated at 34′, and run down groove 78 directly to the joint to be soldered. The spring gate 80 is dimensioned and adjusted so that it will ride over the foremost pellet, thus ejected from the open end 76 of feeder tube 38, and then snap into normal position to retain the next foremost pellet at the open end of the feeder tube.

As will be apparent, when the operator releases pressure from the finger piece 72, the plunger 54–56 returns to normal position under the action of compression spring 60, and another solder pellet previously disposed in hopper dispensing opening 36 just above plunger 54 will fall into bore 44, just behind the rear-most portion of the feeder tube 38. Thus, the feeder device 22 is automatically ready to feed another pellet 34 to the iron tip 30 upon actuation of the finger piece 72 by the operator. It is noted that the leading end 62 of plunger section 54 is made concave so that if the rear-most pellet 34 should tend to "ride up" towards the hopper dispensing opening 36 upon actuation of the plunger 54–56, that pellet is effectively prevented from doing so due to a downward component of force exerted on it by the upper portion of concave plunger end 62. (Concave leading end 62 is preferably the portion of a sphere having a diameter larger than the diameter of pellets 34.)

If more than one pellet of solder is required, the operator can rapidly feed the required number of pellets 34 to provide the desired amount of solder, by rapidly successively depressing the finger piece 72 to successively actuate pellet feeder plunger 54–56. Thus, the right amount of solder can be provided according to predetermined tests, and the substantial waste typical of prior soldering processes and apparatuses can be eliminated.

Figure 4:
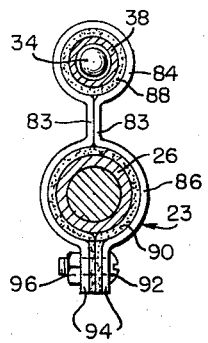
FIGURE 4 is a vertical sectional view along lines 4—4 in FIGURE 3 showing suitable clamp means for mounting the new improved pellet feeder sub-combination of this invention on a conventional soldering iron.
Figure 1:
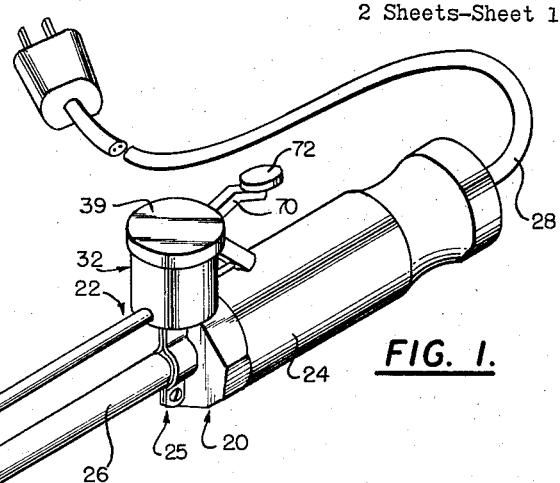
FIGURE 1 is a perspective view of one embodiment of my new improved controlled positive pellet feed soldering iron, utilizing a conventional hand-type soldering iron.
Figure 2:
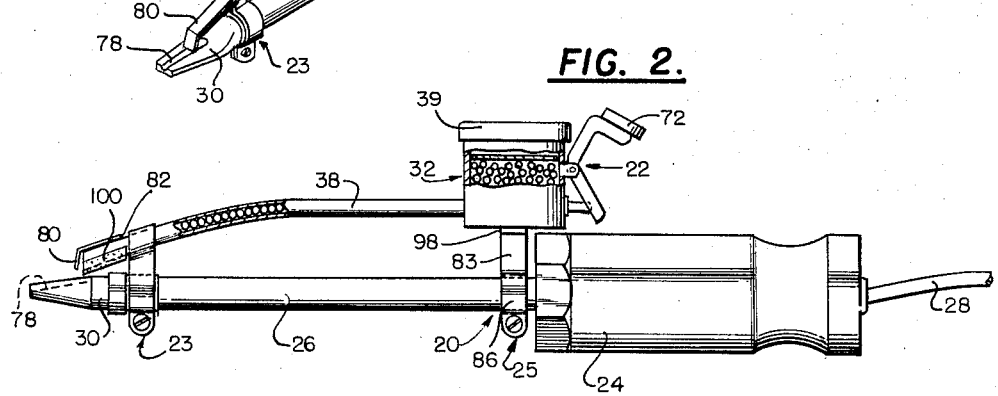
FIGURE 2 is a side elevation view of my new improved hand-type pellet feet soldering iron shown in FIGURE 1, with some parts broken away and shown in section.

Referring to FIGURE 4, clamp means 23 for mounting the above-described pellet feeder device 22 on the soldering iron 20 comprises a metal clamp of suitable configuration as shown in this figure. Clamp web portions 83 are preferably joined, as by spot welding, and the circular clamp parts 84 and 86 are respectively secured with a press fit to the feeder tube 38 and the solder iron shank 26. The circular portions 84 and 86 of clamp 23 are of sufficient diameter to accommodate a strip of heat-resistant material of low thermal conductivity, such as asbestos, indicated by the numerals 88 and 90, interposed between the circular metal clamp sections 84 and 86 and the metal soldering iron shank 26 and feeder tube 38. The clamp 23 can be secured to soldering iron shank 26 by various suitable means; e.g., by a screw 92 extending through aligned bores in downwardly projecting lugs 94 of clamp 23 and the depending extensions of asbestos ring 90, with the screw 92 being secured by a nut 96 (or by being threaded into a tapped hole in one of the downwardly extending clamp lugs 94).

The rearward clamp 25 is similar to above-described clamp 23, and includes like components as those identified by numerals 83, 86, 90, 92, 94 and 96 in FIGURE 4. However, as will be apparent from FIGURES 1–3, clamp 25 does not include an upper circular section; instead, the upper ends of webs 83 are bent 90° thereto to provide a pair of lugs 98, which are welded, brazed or otherwise secured to the underside of pellet hopper 32.

Such clamp means 23 and 25 make it possible to quickly, conveniently and securely mount the pellet feeder device 22 on a conventional soldering iron 20, and to readily remove it for replacement if necessary. It will be noted that these clamp constructions 23 and 25 thermally insulate the pellet feeder tube 38, and the solder pellets 34 contained therein, from the heater element and tip 30 of the soldering iron 20, thus supplementing the insulating effect of the air space between the feeder tube 38 and the hot parts of the soldering iron 20. Clamps 23 and 25 and/or tube 38 may be made of stainless steel, which is of low heat conductivity, to further prevent transfer of heat from the hot parts of the soldering iron to the pellets 34 in the feeder tube. A strip 100 of heat-resistant material of low thermal conductivity such as asbestos is secured in any suitable manner to the underside of the forward end of the pellet feeder tube 38 to further insulate the pellets in the tube from the hot parts of the solder iron. (Strip 100 could be provided as an extension of circular heat-resistant piece 88 within section 84 of clamp 23, and thus be retained on the tube 38 by this clamp section.)

As will be apparent from the foregoing, the construction of the soldering iron pellet feeder device 22 is such as to thermally insulate the solder pellets 34 in the feeder tube 38 from the hot parts of the soldering iron, so that the pellets 34 will not expand and constrict the tube, or melt in the tube, prior to being fed to the soldering tip 30 through the gate 80 as above explained. Hence, the solder iron tip 30 may be safely applied to the workpiece to transfer to it a sufficient amount of heat (B.t.u.'s) before the solder pellet is fed to the work by depressing plunger 72.

Referring to FIGURE 3, if desired, means can be provided in the pellet feeder chamber 32 to impose a pressure on the pellets 34 therein, thereby positively feeding the lower-most pellets into the dispensing opening 36, instead of relying on gravity feed. A suitable pressure applying means illustrated in FIGURE 3 includes a circular plate 102 secured to one end of a compression spring 104, the other end of which is secured to the inside of pellet chamber cover 39 (these parts may be secured to each other in any suitable manner such as welding or brazing). Of course, pellet hopper cover 39 must be securely held in position by suitable means, such as detents 40 (or a screw connection or the like), to prevent its removal from the pellet hopper 32 by the counter force of compression spring 104. However, such a pressure applying means for feeding pellets may be omitted, especially when the work can be conveniently located for use of the iron in sufficiently near-horizontal posture so that the pellets will roll by gravity to dispensing opening 36; keeping pellet hopper 32 quite full of pellets will facilitate this.

Before describing the other embodiments of this invention, disclosed in FIGURES 5, 6, 7, 8 and 9, it is noted that for the purpose of clarity and to avoid undue duplication of description, parts in those embodiments which have the same construction as in the above-described embodiment of FIGURES 1–4 are identified by like numerals, and corresponding parts which may be somewhat modified are identified by like numerals, but with a letter sub-script.

Figure 5:
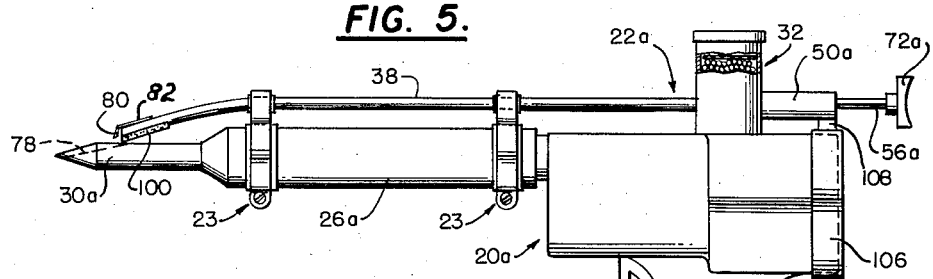
FIGURE 5 is a side elevation view of a modified form of my new improved controlled positive pellet feeder invention for a conventional pistol grip soldering iron.
Figure 6:
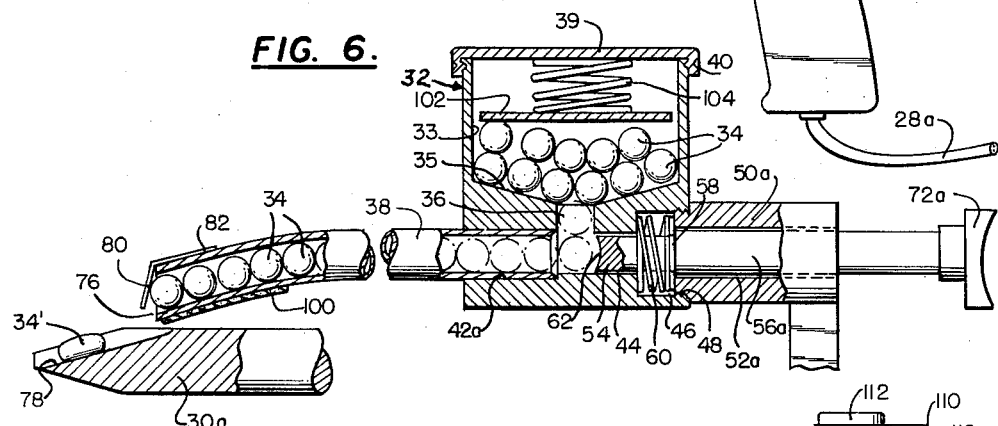
FIGURE 6 is an enlarged elevation view of the new improved controlled positive pellet feeder system for the pistol grip soldering gun embodiment of FIGURE 4, with many of the parts being broken away and shown in section for purposes of clearer illustration.

Referring to FIGURES 5 and 6, there is shown a controlled positive pellet feed soldering iron of the gun type, comprising a conventional soldering iron gun generally indicated by the numeral 20a and a pellet feeder according to the present invention generally indicated by the numeral 22a mounted on the solder gun by means including clamps 23.

The solder gun 20a comprises a thermosetting plastic handle 24a with a power input cord 28a extending from the base thereof and a heating element sub-assembly 26a extending forwardly from the handle 24a and having at its forward end a heating tip 30a, the upper side of which is provided with a longitudinal groove 78 (as in the FIGURES 1–4 embodiment). The pellet feeder 22a for this soldering iron embodiment is substantially like the above-described pellet feeder 22 of the FIGURES 1–4 embodiment, the principal difference being in the hand actuated plunger arrangement for feeding pellets through feeder tube 38. Accordingly, extended discussion of pellet hopper 32 and its components, pellet feeder tube 38, forward spring gate 80, and mounting clamps 23, etc., is believed unnecessary, since the construction thereof is clear from FIGURES 5 and 6 and the foregoing description of FIGURES 1–5. It is noted, however, that the feeder device 22a of FIGURES 5 and 6 is mounted on the solder gun 20a by a pair of like insulated clamps 23 with the bottom of the pellet hopper resting on the top of the solder gun handle 24a (instead of by means of clamps 23 and 25 as in FIGURES 1–3).

Referring especially to the enlarged view of FIGURE 6, in this embodiment the hand actuated plunger means comprises a rearwardly extended plunger section 56a slidably received in a central bore 52a of an elongated boss 50a which is threaded at its forward end into the threads 48 at the open end of recess 46 in the pellet hopper 32. The end of elongated rod 56a is provided with a finger piece 72a for reciprocating the rod in the aligned apertures 44 and 52a.

The rear end of the pellet feeder assembly 22a is also secured to solder gun 20a by a band 106 which is secured to boss 50a by an intermediate spacer lug 108. Band 106 is of the same configuration as the butt end of solder gun 20a, and fits securely around the rear side edges of the butt. (If desired, the rearward edge of band 106 may be provided with an inwardly extending lug for engaging the vertical rear face of the butt.) By the foregoing construction, it is possible to remove the pellet feeder unit 22a from the solder gun by first sliding it rearward so that the band 106 clears the end of the gun butt, and then turning boss 50a, lug 108 and band 106 through 90°, so that the band 106 clears the solder gun and permits removal of feeder unit 22a from the forward end.

As will be apparent from the foregoing description, the operation of the pellet feeder 20a for soldering gun 22a is substantially the same as the operation of the above-described embodiment of FIGURES 1–4. Namely, finger piece 72a is depressed by the operator, and the force exerted on the rear-most pellet 34 by the end 62 of plunger 54–56a is transmitted to the foremost pellet 34 just behind the spring gate 80 to push it a distance greater than its radius but less than its diameter. This forces the foremost pellet out of the forward opening 76 onto the heated iron tip 30a, where the pellet promptly melts (as indicated at 34' in FIGURE 6) and is channeled by groove 78 to the joint to be soldered.

Figure 7:
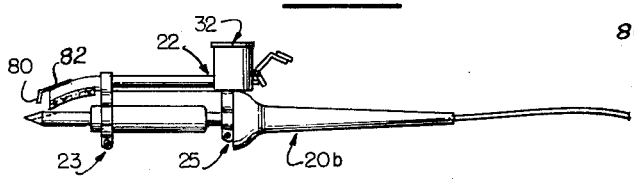
FIGURE 7 is a side elevation view of a pencil-type soldering iron incorporating the positive solder pellet feeder of the present invention.

FIGURE 7 illustrates a conventional pencil type soldering iron, generally indicated by the numeral 20b, incorporating my new improved soldering iron pellet feeder device 22, which is secured to the soldering iron by clamp means 23 and 25. Such pencil type soldering irons are especially designed for delicate precision work on radio, television sets, electronic devices, and other small devices with intricate electrical connections, to eliminate work fatigue. The pellet feeder device generally indicated by the numeral 22, and its mounting means generally indicated by the numerals 23 and 25 in FIGURE 7, are the same as the corresponding pellet feeder device and mounting means in the embodiment of FIGURES 1–4. Hence, extended discussion of this embodiment is unnecessary.

Referring to FIGURE 8, there is shown a further improvement according to the present invention in which means are provided for applying flux to the solder pellets 34 just prior to discharge onto the soldering iron tip. For this purpose, an L-shaped bracket 110 is mounted on pellet feeder tube 38 adjacent its forward end by any suitable means, such as a press fit between the feeder tube 38 and an aperture 112 extending through the vertical part of L-bracket 110. The horizontally extending arm of the L-shaped bracket 110 supports a suitable reservoir 112 for a soldering flux solution, and a wick 114 extends through an aligned aperture 116 in the top of pellet feeder tube 38 and along the upper side of the pellet feeder tube as illustrated in FIGURE 8. Thus, the flux within the reservoir 112 will be fed by the wick to the solder pellets 34 in the discharge region of the pellet feeder tube, just before the foremost pellet is ejected from the feeder tube and onto the soldering iron tip (not shown in this figure). Of course, other specific types of flux applying means can be combined with the solder pellet feeder device 22 of the present invention in accordance with the teachings herein.

In lieu of a means for applying flux to all-metal solder pellets, as discussed in connection with FIGURE 8, the solder pellets can be made with a suitable amount of flux material incorporated. Referring to FIGURE 9, the solder pellet indicated by the numeral 34c, is made of the desired metal alloy, with a bore 110 of suitable size which is filled with a suitable flux material 112. The bores 110 of pellets 38c can be filled with flux by immersing the pellets in a container of granular flux and applying air pressure to the top of the flux to drive the flux into the bore 110.

It will be apparent from the foregoing description that the present invention provides new improved and efficient pellet feeder soldering iron combinations, and new improved pellet feeder sub-combinations usable with various conventional soldering irons, for positive controlled feeding of one solder pellet at a time to the heated iron tip; and that my new improved positive acting pellet feeder soldering irons, and pellet feeder sub-combinations, achieve the objects and advantages and improved results set forth earlier in this application, and overcome various serious shortcomings of the many prior attempts to provide improved feeder type soldering irons in lieu of conventional two-hand wire and iron soldering methods as above discussed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The combination of a soldering iron with a device for feeding individual pieces of solder comprising: a soldering iron including a handle of low thermal conductivity material and a shank portion adapted to have a soldering tip on the forward end thereof; a hopper for holding a plurality of said individual pieces of solder mounted on said soldering iron adjacent said handle; a feeder tube adapted to receive a plurality of aligned solder pieces extending from said hopper to adjacent the forward end of the soldering iron, said feeder tube being spaced from the hot parts of the soldering iron, with the open end of the feeder tube so positioned that it is disposed over a soldering tip on the forward end of the iron; a passage for transfer of said solder pieces between said hopper and said feeder tube; means for pushing individual pieces of solder from said passage into said feeder tube; gate means for preventing said solder pieces from escaping from the open end of said feeder tube, while permitting the foremost piece of solder in the feeder tube to be ejected through the open end thereof when said pushing means is operated and the movement thereof is transferred to the foremost piece of solder.

2. The combination of a soldering iron with a device for feeding individual pieces of solder as defined in claim 1, which further comprises: a solder tip having a longitudinally extending groove in the upper side thereof, with the rear portion of said groove disposed below said open end of the feeder tube, whereby said groove directs solder ejected thereon to the forward end of the tip.

3. The combination of a soldering iron with a device for feeding individual pieces of solder as defined in claim 1, which further comprises: clamp means for supporting the above-recited solder feeding device on the soldering iron, with said clamp means including means for thermally isolating the solder feeding device from the hot parts of the soldering iron.

4. The combination of a soldering iron with a device for feeding individual pieces of solder as defined in claim 3, further comprising: insulating means on the lower forward end of said feeder tube near the tip end of the soldering iron.

5. The combination of a soldering iron with a device for feeding individual pieces of solder as defined in claim 3, wherein: said handle of the solder iron is aligned with said shank portion of the iron, and one of said clamp means supports the front end of the feeder tube on the shank portion of the iron and another of said clamp means supports said hopper on the shank portion of the iron.

6. The combination of a soldering iron with a device for feeding individual pieces of solder as defined in claim 1, wherein said handle of the soldering iron is aligned with said shank portion of the iron, and said means for push-feeding the solder pieces is a reciprocable plunger means and further comprising: bell crank means pivotally mounted on said hopper for operating said plunger means to feed individual pieces of solder to the forward end of said feeder tube; and spring means for returning said plunger means and bell crank operating means to unoperated position, after operation thereof to eject a piece of solder.

7. The combination of a soldering iron with a device for feeding individual pieces of solder as defined in claim 3, wherein: said soldering iron is a gun-type with a pistol-type handle, with a pair of said clamps supporting the front and rear portions of said feeder tube on the shank of the iron, with said hopper also being supported on the top of said pistol-type handle.

8. The combination of a soldering iron with a device for feeding individual pieces of solder as defined in claim 1, wherein: said soldering iron is a gun-type with a pistol-type handle, and said means for push-feeding the solder pieces to the forward end of said feeder tube is a reciprocable plunger which extends rearward to adjacent the rear of said pistol-type handle, and further comprising spring means for returning said plunger means to unoperated position, after operation thereof to eject a piece of solder from the forward end of said feeder tube.

9. The combination of a soldering iron with a device for feeding individual pieces of solder as defined in claim 8, further comprising: a boss extending from the rear of said hopper to adjacent the rear of said pistol-type handle, with said boss slidably receiving said plunger means; a lug extending laterally from said boss; and a band secured to said lug and extending around the rear end of said pistol handle.

10. The combination of a soldering iron with a device for feeding individual pieces of solder as defined in claim 1, wherein the bottom of said hopper is sloped towards said transfer passage between the hopper and feeder tube, and further comprising: spring biasing means in the top of said hopper for applying a force to said pieces of solder in the hopper to impel the solder pieces on said sloping hopper bottom into said passage.

11. The combination of a soldering iron with a device for feeding individual pieces of solder as defined in claim 1, wherein: said push-feeding means is a plunger having a concave forward end.

12. The combination of a soldering iron with a device for feeding individual pieces of solder as defined in claim 1, further comprising: means for feeding flux to the pieces of solder in the feeder tube adjacent the forward end thereof prior to ejection from the feeder tube.

13. The combination of a soldering iron with a device for feeding individual pieces of solder as defined in claim 1, wherein: said gate means comprises a generally L-shaped spring secured to the upper side of said feeder tube and partially extending over the forward end of said feeder tube.

14. For a soldering iron, a device for feeding individual pieces of solder to the tip of the iron comprising: a hopper for holding a plurality of individual pieces of solder, adapted to be mounted adjacent the handle of a soldering iron; an elongated feeder tube extending from said hopper, adapted to receive a plurality of individual pieces of solder in aligned relation, said feeder tube being adapted to be mounted on the shank of a soldering iron spaced therefrom with the open end of the feeder tube so positioned that it is disposed over the soldering tip of the iron; a passage for transfer of said individual solder pieces between said hopper and said feeder tube; means for pushing pieces of solder from said passage into said feeder tube; gate means for preventing said solder pieces from escaping from the open end of said feeder tube, while permitting the foremost piece of solder in the feeder tube to be ejected through the open end thereof when said pushing means is operated.

15. For a soldering iron, a device for feeding individual pieces of solder as defined in claim 14, which further comprises: clamp means for supporting the above-recited feeder device on a conventional soldering iron, said clamp means including means for thermally isolating the solder feeder device from the hot parts of the soldering iron.

16. For a soldering iron, a device for feeding individual pieces of solder as defined in claim 15, further comprising: insulating means on the lower forward end of said feeder tube, adapted to be disposed near the soldering tip when the feeder device is mounted on a soldering iron.

17. For a soldering iron having a handle which is aligned with the shank of the iron, a device for feeding individual pieces of solder as defined in claim 15, wherein: one of said clamp means is on the front end of the feeder tube and another of said clamp means extends from the underside of said hopper.

18. For a soldering iron having a handle which is aligned with the shank of the iron, a device for feeding individual pieces of solder as defined in claim 14, wherein said means for push-feeding the solder pieces is a reciprocable plunger, and further comprising: bell crank means pivotally mounted on said hopper for operating said plunger to feed the individual pieces of solder to the forward end of said feeder tube; and spring means for returning said plunger means and bell crank means to unoperated position.

19. For a soldering iron of the gun type with a pistol-type handle, a device for feeding individual pieces of solder as defined in claim 15, wherein: a pair of said supporting clamp means are on said feeder tube adjacent the front and rear ends thereof respectively, said hopper being adapted to be also supported on the top of said pistol-type handle.

20. For a soldering iron of the gun type with a pistol-type handle, a device for feeding individual pieces of solder as defined in claim 14, wherein: said means for push-feeding of said solder pieces is a reciprocable plunger which extends rearwardly from the hopper so it is normally disposed adjacent the rear of said pistol type handle when the feeder device is on the iron, and further comprising spring means for returning said plunger means to unoperated position after operation thereof to eject a piece of solder from the forward end of said feeder tube.

21. For a soldering iron, a device for feeding individual pieces of solder as defined in claim 14, wherein: the bottom of said hopper is sloped towards said transfer passage between the hopper and feeder tube, and further comprising spring biasing means in the top of said hopper for applying a force to said pieces of solder in the hopper to impel the solder pieces on said sloping bottom of the hopper into said passage.

22. For a soldering iron, a device for feeding individual pieces of solder as defined in claim 14, wherein: said means for push-feeding the solder pieces is a reciprocable plunger having a concave forward end.

23. For a soldering iron, a device for feeding individual pieces of solder as defined in claim 14, further comprising: means for feeding flux to the pieces of solder in the feeder tube adjacent the forward end thereof.

24. For a soldering iron, a device for feeding individual pieces of solder, wherein: including a gate means comprising a generally L-shaped spring secured to the upper side of said feeder tube and partially extending over the forward end of said feeder tube.

(References on following page)

References Cited in the file of this patent

UNITED STATES PATENTS

| | | |
|---|---|---|
| 1,232,734 | Tilton | July 10, 1917 |
| 1,691,052 | Fay | Nov. 13, 1928 |
| 2,175,100 | Albert | Oct. 3, 1939 |
| 2,447,110 | Bitzenburger | Aug. 17, 1948 |
| 2,721,378 | Oliver et al. | Oct. 25, 1955 |
| 2,815,729 | Goodman | Dec. 10, 1957 |
| 2,818,041 | Chill et al. | Dec. 31, 1957 |
| 2,821,947 | Von Knauf | Feb. 4, 1958 |
| 2,875,719 | Smith | Mar. 3, 1959 |
| 2,932,882 | Kelly | Apr. 19, 1960 |

FOREIGN PATENTS

| | | |
|---|---|---|
| 216,807 | Australia | Nov. 15, 1956 |
| 13,928 | France | May 30, 1911 |

UNITED STATES PATENT OFFICE
CERTIFICATE OF CORRECTION

Patent No. 3,146,747                              September 1, 1964

John N. Stebbing, Jr.

It is hereby certified that error appears in the above numbered patent requiring correction and that the said Letters Patent should read as corrected below.

Column 3, line 73, for "29" read -- 39 --; column 6, line 68, for "1-5" read -- 1-4 --.

Signed and sealed this 27th day of April 1965.

(SEAL)
Attest:

ERNEST W. SWIDER                           EDWARD J. BRENNER
Attesting Officer                            Commissioner of Patents